M. LAWLER.
TRAP.
APPLICATION FILED APR. 29, 1908.
903,296.
Patented Nov. 10, 1908.
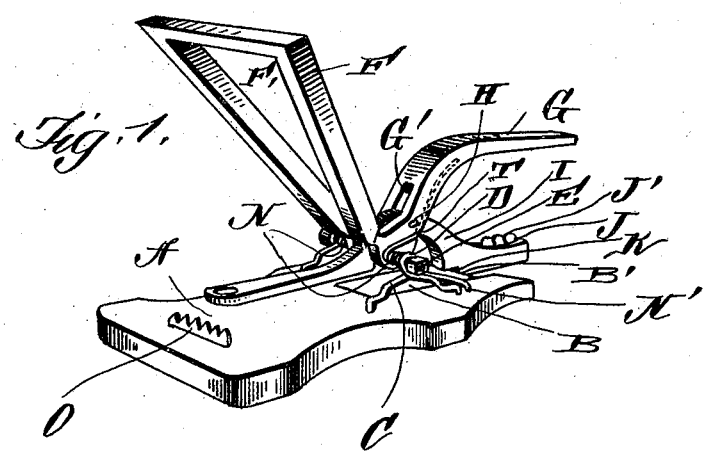
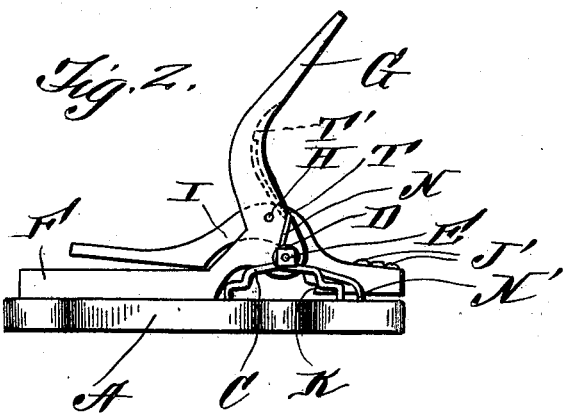
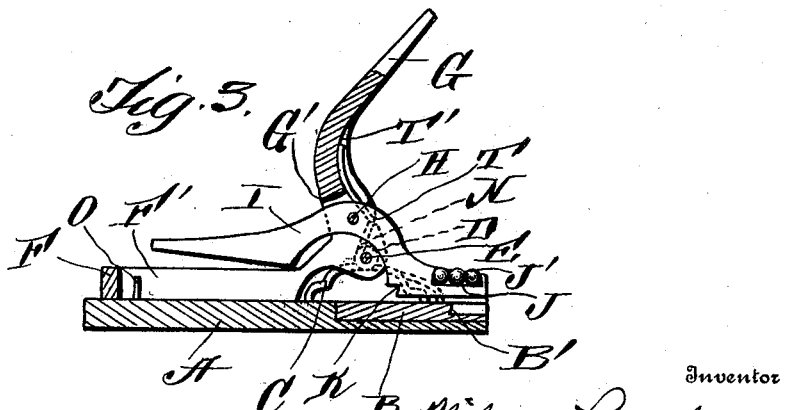
Witnesses
Inventor
Miles Lawler,
By Franklin H. Hough
Attorney

UNITED STATES PATENT OFFICE.

MILES LAWLER, OF PARNELL, IOWA, ASSIGNOR OF ONE-HALF TO MATTHEW LAWLER, OF PARNELL, IOWA.

TRAP.

No. 903,296.     Specification of Letters Patent.     Patented Nov. 10, 1908.

Application filed April 29, 1908. Serial No. 429,951.

*To all whom it may concern:*

Be it known that I, MILES LAWLER, a citizen of the United States, residing at Parnell, in the county of Iowa and State of Iowa, have invented certain new and useful Improvements in Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in animal traps and the object in view is to produce a simple and efficient apparatus of this nature which will be effective in operation and simple in construction, and comprises various details of construction, combinations and arrangements of parts which will be hereinafter fully described and then specifically defined in the appended claims.

I illustrate my invention in the accompanying drawings, in which:—

Figure 1 is a perspective view of my improved trap, showing the same set. Fig. 2 is a similar view showing it sprung, and Fig. 3 is a longitudinal sectional view through the trap.

Reference now being had to the details of the drawings by letter, A designates the base of the trap, which may be of metal or any suitable material, and the upper surface of said base is provided with a countersunken plate B, having an inclined shoulder B', serving as a catch over which the trigger is adapted to catch. Rising from said base plate are the bracket bearing members C, made preferably of wire, which are bent to form eyes D in which a pin E is journaled. The jaw of the trap, designated by letter F, is preferably of triangular shape with a central opening F' and is pivotally mounted upon said pin and has a curved handle G whereby the trap may be conveniently set without the operator taking hold of the jaw. Said handle has a recessed portion G', and H designates a pivot pin passing through the walls of said recessed portion of the handle. A trigger, designated by letter I, is pivotally mounted upon the pin H carried by the handle. The rear end of said trigger is recessed away as at J forming a receptacle in which weights J' are positioned for the purpose of counter-balancing the long arm of the trigger and causing a shoulder K formed upon the under side of the short arm of the trigger to normally drop behind the catch formed in the countersunken plate B, whereby the trap may be held set. Springs N are coiled about the pivot pin upon which the jaw is mounted and at corresponding ends N' bear against the upper surface of the base plate and their rear ends extend through the recesses or notches T formed in the rear of the handle and are seated in grooves T', as shown clearly in the detail view in rear elevation of said handle. The purpose of said springs is to normally throw the jaw forcibly against the upper surface of the base plate when the trigger is sprung. A serrated plate O is seated in the upper surface of the base plate adjacent to one end thereof and is provided for the purpose of impaling the animal caught and assisting in breaking the neck as the jaw springs forcibly down under the action of the spring as the trap is sprung.

From the foregoing, it will be noted that, by the provision of a trap as shown and described, a simple and efficient device is afforded which will effectually break the neck of an animal being caught thereby and securely hold the victim between the jaw and the plate. It will also be noted that, by the provision of a trap made as shown and described, the trap may be conveniently set without the necessity of the operator taking hold directly of the jaw which is commonly necessary and which is dangerous to the fingers of the operator.

What I claim to be new is:—

1. A trap comprising a plate, a catch upon the upper surface thereof, a jaw pivotally mounted upon said plate and having a curved handle, a spring adapted to forcibly throw said jaw against the plate, and a trigger carried by the handle adapted to engage said catch, as set forth.

2. A trap comprising a plate, a catch upon the upper surface thereof, a jaw pivotally mounted upon said plate and having a curved handle, said handle being recessed, a trigger pivotally mounted in said recess of the handle and having a shouldered portion adapted to automatically engage the catch upon the plate, and a spring adapted to forcibly throw the jaw against the plate, as set forth.

3. A trap comprising a plate, a catch mounted upon the upper surface thereof, a jaw having an opening therein and pivotally mounted upon said plate, a trigger pivotally mounted upon said jaw, one end of the trigger being weighted and having a shoulder adapted to engage over the catch upon said plate and its other end extending through the opening in the jaw to provide a bait supporting finger, and a spring for forcibly throwing the jaw against the plate, as set forth.

4. A trap comprising a plate, a catch mounted upon the upper surface thereof, a jaw having an opening therein and pivotally mounted upon said plate, said jaw having a grooved handle with a notch in the edge thereof, a trigger pivotally mounted upon said jaw, one end of the trigger being weighted and having a shoulder adapted to engage over the catch upon said plate and its other end extending through the opening in the jaw, a coiled spring mounted upon the pivot of the jaw and one end bearing against the plate, its other end extending through the notch in the handle and seated in a groove therein, as set forth 5. A trap comprising a plate, a bracket support thereon, a shaft mounted in the latter, a jaw having an opening therein, and provided with a curved grooved handle, said jaw being pivoted to said bracket and having a recess adjacent to its pivotal part, a pin passing through the walls of said recess, a trigger pivotally mounted upon said pin and provided with a recess in its under edge, the rear end of said trigger being weighted and having a shoulder, a catch upon said plate adapted to be engaged by said shoulder, the forward end of the trigger extending through the opening in said jaw, and springs coiled about said shaft and engaging said groove in the handle, as set forth.

In testimony whereof I hereunto affix my signature in the presence of two witnesses.

MILES LAWLER.

Witnesses:
 JAMES M. WOODS,
 CHARLES HOFFEE.